(12) United States Patent
Viertl

(10) Patent No.: US 7,303,373 B2
(45) Date of Patent: Dec. 4, 2007

(54) WIND TURBINE SYSTEMS, MONITORING SYSTEMS AND PROCESSES FOR MONITORING STRESS IN A WIND TURBINE BLADE

(75) Inventor: John Ruediger Mader Viertl, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 11/263,328

(22) Filed: Oct. 31, 2005

(65) Prior Publication Data
US 2007/0098551 A1 May 3, 2007

(51) Int. Cl.
*B64C 11/30* (2006.01)
(52) U.S. Cl. ............... 416/1; 416/31; 416/61; 415/1; 415/118
(58) Field of Classification Search ............ 416/1, 416/31, 35, 40, 43, 61; 415/1, 118
See application file for complete search history.

(56) References Cited

U.S. PATENT DOCUMENTS

| 4,360,871 | A | 11/1982 | Blaney | 364/300 |
|---|---|---|---|---|
| 4,728,263 | A | 3/1988 | Basso | 416/226 |
| 6,619,918 | B1 * | 9/2003 | Rebsdorf | 416/1 |
| 6,771,903 | B1 | 8/2004 | Cousineau | 398/17 |
| 6,940,186 | B2 * | 9/2005 | Weitkamp | 290/44 |
| 7,086,834 | B2 * | 8/2006 | LeMieux | 416/1 |
| 2004/0057828 | A1 | 3/2004 | Bosche | 416/1 |

FOREIGN PATENT DOCUMENTS

| DE | 20110821 U1 | 6/2001 |
|---|---|---|
| DE | 10259680 A * | 7/2004 |
| WO | WO01033179 A1 * | 5/2001 |
| WO | 2004/088130 A1 | 10/2004 |
| WO | 2005/071382 A1 | 8/2005 |
| WO | WO05071382 A1 * | 8/2005 |

* cited by examiner

*Primary Examiner*—Igor Kershteyn
(74) *Attorney, Agent, or Firm*—Cantor Colburn LLP

(57) ABSTRACT

Wind turbine systems, monitoring systems, and processes for measuring stress in a wind turbine blade generally includes embedding and or disposing optical glass fibers on a surface of the wind turbine blade and monitoring light transmission through the optical glass fiber. A reduction or loss of transmission indicates that the tensile strength of the optical glass fiber has been exceeded, which directly correlates to the level of stress exposed to the wind turbine blade.

20 Claims, 2 Drawing Sheets

WIND TURBINE SYSTEMS, MONITORING SYSTEMS AND PROCESSES FOR MONITORING STRESS IN A WIND TURBINE BLADE

BACKGROUND

The present disclosure generally relates to wind turbines, and more particularly, to a monitor for measuring stress in a wind turbine blade during operation of the wind turbine as well as to processes for monitoring stress in a wind turbine blade.

Wind turbines generally convert the mechanical energy captured by the rotating wind turbine blades into electrical energy using a generator. A wind turbine, like some other structures such as aircraft propellers, fans, and the like, includes blades configured for rotating about an axis. Typically, two or more blades are provided each coupled to a rotatable hub. Most turbines have either two or three blades. Wind blowing over the blades causes the blades to lift and rotate. During this conversion, the wind turbine blades can be exposed to relatively large and variable loads during their operation. Because wind is a natural force and cannot be controlled, the wind turbine must withstand exposure to varying wind conditions from no wind at all to winds in excess of 100 miles per hour.

Cyclic stresses can fatigue the blade, axle and bearing materials, and have been a cause of turbine failure for many years. Components that are subject to repeated bending, such as rotor blades, may eventually develop cracks that ultimately may make the component break. Current monitoring processes for measuring the stress applied to the wind turbine blades employ the use of strain gages. The strain gauges are typically flat electrical resistors that are glued onto the surface of the rotor blades being tested and are used to measure very accurately the bending and stretching behavior of the rotor blades. The measurement that results from the strain gauges can be continuously monitored on computers. Nonlinear variations in the pattern of bending may reveal damage to the rotor blade structure.

Other methods for monitoring blade fatigue include infrared analysis (also referred to as thermography). In these methods, infrared cameras are typically used to reveal local build-up of heat in the blade. The heat build-up may either indicate an area with structural dampening, i.e. an area where the blade designer has deliberately laid out fibers which convert the bending energy into heat in order to stabilize the blade, or it may indicate an area of delamination or an area which is moving toward the breaking point for the fibers. In this manner, catastrophic failure can be prevented.

Rotor blades are also tested for strength (and thus their ability to withstand extreme loads) by being bent once with a very large force. This test is made after the blades has been subject to fatigue testing, in order to verify the strength for a blade which has been in operation for a substantial amount of time.

Although the above noted monitoring processes are suitable for their intended use, they are generally complex in nature or cannot be implemented during actual operation of the wind turbine. Accordingly, it is desirable to have a relatively simple method for monitoring stress in the wind turbine blade so as to prevent the occurrence of catastrophic failures.

BRIEF SUMMARY

Disclosed herein are monitoring systems, wind turbine systems and processes for monitoring stress in a wind turbine blade. In one embodiment, the monitoring system for a wind turbine blade comprises a glass optical fiber embedded and/or on a surface of the wind turbine blade, the wind turbine blade comprising a composite material; an optical receiver in optical communication with an end of the optical glass fiber; and a transmitter in optical communication with an other end of the optical glass fiber.

The wind turbine system comprises a nacelle seated on a tower; a rotor rotatably coupled to the nacelle, the rotor comprising a central hub and at least one wind turbine blade attached thereto, wherein the at least one wind turbine blade is formed of a composite material and has a glass optical fiber embedded and/or on a surface of the wind turbine blade; an optical receiver in optical communication with an end of the optical glass fiber; and a transmitter in optical communication with an other end of the optical glass fiber.

A process for monitoring stress in a wind turbine blade of a wind turbine system comprises embedding and/or disposing an optical glass fiber on a surface of the wind turbine blade, wherein one end of the optical glass fiber is in optical communication with a light transmitter and an other end of the optical glass fiber is in optical communication with an optical receiver; transmitting light from the light transmitter through the optical glass fiber to the optical receiver; and monitoring a reduction or a loss in light transmission through the optical glass fiber.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
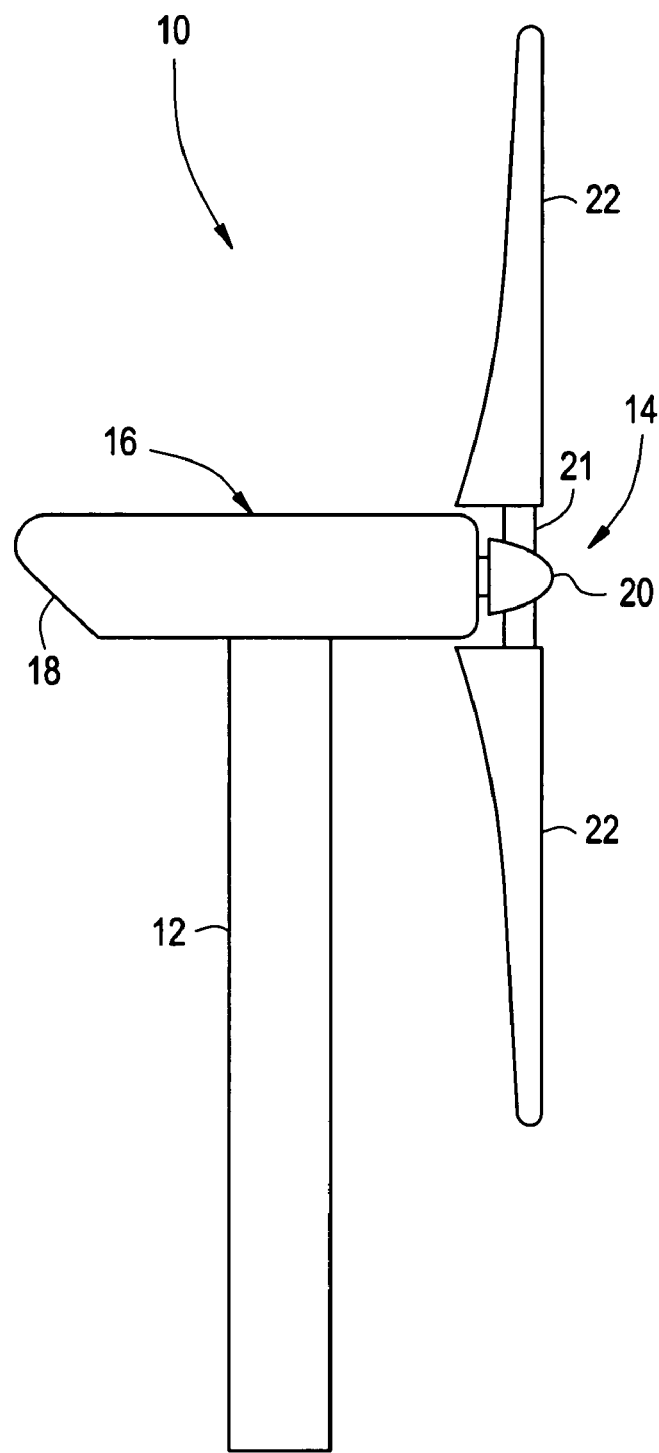
FIG. 1 schematically illustrates a sectional view of a turbine blade including an array of optical fibers coupled to a monitor.

FIG. 1 illustrates an exemplary wind turbine generally designated by reference numeral 10 with which the present disclosure may be practiced. It is to be understood that the wind turbine has been simplified to illustrate only those components that are relevant to an understanding of the present disclosure. Those of ordinary skill in the art will recognize that other components may be required to produce an operational wind turbine 10. However, because such components are well known in the art, and because they do not further aid in the understanding of the present disclosure, a detailed discussion of such components is not provided. It should also be understood that the wind turbine monitor and processes for monitoring stress in a wind turbine blade are nor intended to be limited to the particular wind turbine shown. The monitor and processes herein are generally applicable to monitoring turbine blades used in horizontal axis wind turbines, vertical axis turbines (also referred to as a Darrieus machine), and the like.

The wind turbine generally includes a tower 12. The tower 12 is typically made from tubular steel as shown or is formed of a steel lattice network. Because wind speed increases with height, taller towers enable turbines to capture more energy and generate more electricity. A rotor 14 attaches to a nacelle 16, which sits atop the tower 12 and generally includes a gearbox or a direct drive mechanism, low- and high-speed shafts, a generator, a controller, and a brake. A cover 18 protects the components inside the nacelle 16.

The gearbox generally contains gears that connect the low-speed shaft to the high-speed shaft and increase the rotational speeds from about 30 to about 60 rotations per minute (rpm) to about 1,200 to about 1,500 rpm, which is the rotational speed required by most generators to produce electricity, although lower or higher speeds can be used. During operation, the high-speed shaft drives the generator whereas the low-speed shaft rotates as a function of rotor rotation. The controller generally starts up the machine at wind speeds of about 8 to 16 miles per hour (mph) and shuts off the machine at a higher speed to prevent overheating of the generator. The brake, which can be applied mechanically, electrically, or hydraulically to stop the rotor in emergencies, can be of a disc or drum brake design, an electromagnetic design, or the like.

For horizontal axis wind turbines, the nacelle 16 may further include a yaw drive that orients the nacelle so that the blades are substantially perpendicular to the prevailing wind. A wind direction sensor, e.g., a wind vane, may be included in and/or attached to the nacelle 16 to detect the wind direction. The wind sensor communicates with the yaw drive to orient the turbine properly with respect to the wind. Vertical axis turbine machines will not include a yaw drive.

Figure 2:
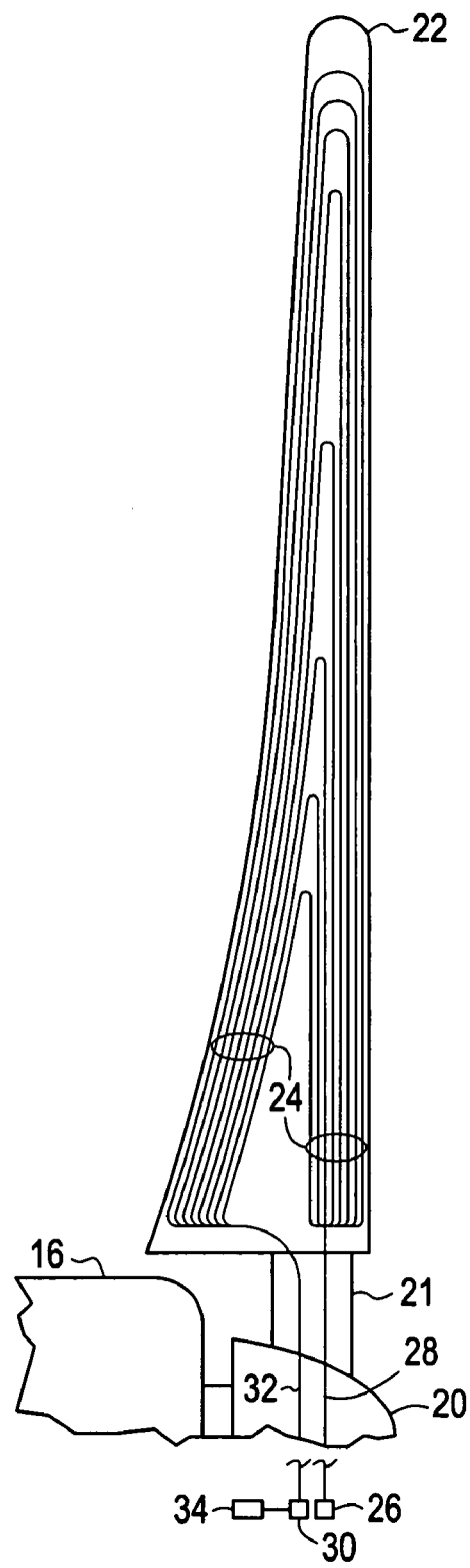
FIG. 2 illustrates a sectional view of a rotor including a wind turbine blade having a plurality of optical fibers therein or thereon for monitoring the stress applied to the wind turbine blade during operation.

FIG. 2 illustrates a partial sectional view of the rotor 14 and nacelle 16. The rotor includes a hub 20 and one or more blades 22 extending from the hub 20. The point of attachment of the blade 22 to the hub is generally referred to as the root 21. The one or more of the wind turbine blades 22 include one or more glass optical fibers 24 disposed on or within the wind turbine blade 22. The glass optical fiber 24 spans across a portion of the blade 22 that is to be monitored. An optical receiver 26 is in optical communication with one end 28 of the fiber and a light source 30 is in optical communication with other end 32. In this manner, the integrity of the optical fiber can be monitored during operation of the wind turbine. In one embodiment, the ends 28, 30 terminate at about the root 21 of the wind turbine blade. In still other embodiments, the ends terminate with the nacelle 16. In still other embodiments the ends terminate at a location external to the blade and nacelle.

Light transmission through the optical fiber can be monitored to detect any changes thereto. Any changes in light transmission can be indicative of a break in the optical fiber. By varying the diameter for different glass optical fibers, an end user can estimate the maximum tensile load that can be applied to the blade. For example, if the glass optical fiber breaks during operation of the wind turbine, the breakage is an indication that the stress applied by the wind force exceeded the strength of the fiber. Since fibers of different diameters have breaking stresses that are a function of fiber diameter, these fibers can be used as indictors of blade overload.

The wind turbine blades 22 are usually made using a matrix of glass fiber mats, which are impregnated with a material such as polyester. The polyester is hardened after it has impregnated the glass fiber. Epoxy may be used instead of polyester. Likewise the basic matrix may be made wholly or partially from carbon fiber, which is a lighter, but costlier material with high strength. Wood-epoxy laminates are also being used for large rotor blades. The glass optical fibers 24 can be embedded within the matrix or may be applied to a blade surface after the wind turbine blade has been formed.

Figure 3:
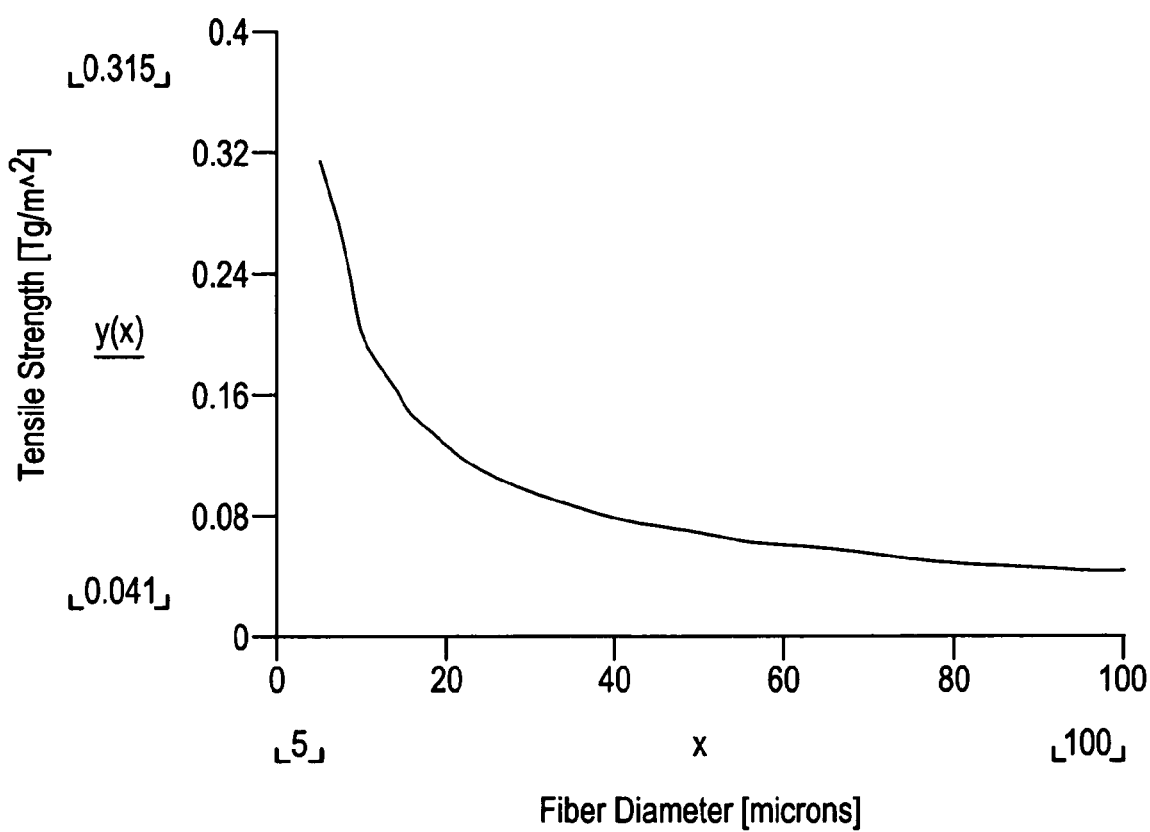
FIG. 3 graphically illustrates tensile strength as a function of glass fiber diameter.

FIG. 3 graphically illustrates tensile strength of glass optical fibers a function of fiber diameter. It is observed and is widely known by those in the art that tensile strength rapidly increases as fiber diameter decreases. It can be expected that a similar relationship will be observed when the optical fiber is placed in the environment provided in the present disclosure, i.e., optical fibers embedded in and/or on the surface of the wind turbine blade. More importantly, because of this relationship, a range of fiber diameters can be embedded in and/or on the surface of the wind turbine blade to provide a tensile strength range to be monitored and correlated to the tensile strength of the wind turbine blade itself.

Several configurations of turbine wind blades including the glass optical fibers are contemplated herein. In one embodiment, at least a portion of the glass optical fibers spanning the wind turbine blade is formed of fibers having different diameters. In another embodiment, a single or multiple fibers of the same diameter are embedded and/or on a surface of the blade. In still another embodiment, an optical fiber having a variable diameter. For example, the diameter can increase or decrease from one end to the other end. In this embodiment, pulse propagation methods can be used with the monitoring system to determine the location of the break and correlate he location to the tensile strength associated with the fiber diameter at the break location. Of course, it should be noted that pulse propagation techniques could be used for any of the embodiments described here in to locate the position of the break. In this manner, the break location could be used the design of the wind turbine blade such that the optical fiber break location would be fortified in the design of the blade so as to increase the tensile strength.

The range of fiber diameters are not intended to be limited and will generally depend on the desired range of tensile strength to be measured. For the glass optical fibers, the diameter of the core can generally range between about 10 to about 600 microns, the cladding thickness can be between about 125 to about 630 microns, and that of the jacket, if present, varies between about 250 to about 1040 microns.

Each one of the optical glass fibers is in optical communication with the optical receiver on one end and a transmitter (light source) on the other end. In this manner, the loss or reduction of transmitted light in a fiber can be used to indicate breakage along the length of the optical fiber spanning a portion of the wind turbine blade. The loss or reduction of transmitted light infers the fiber's maximum tensile strength at the point of breakage was exceeded. Optionally, a bundle of several fibers can be used to bracket the value of the applied tensile strengths. The data thus generated can be combined with an understanding of the fracture energy and the details of the fiberglass reinforced composite fracture mechanism. Although this may lead to some correction of the data that was used to provide the graph in FIG. 3, it will still be understood by those in the art that the basic approach to determining tensile strength at various points of the turbine blade will not change.

The optical receiver and/or light transmitter may be integrated into the nacelle 16 and/or may be located externally within or about the tower 12. Data generated from the optical receiver can be processed using algorithm programmed by a computer (not shown), or the like. The optical receiver can be any available photodetector sensitive to the light transmitted from the light transmitter. For example, the optical receiver can be a photodiode responsive to radiation emitted from the light transmitter. A wind turbine system utilizing the monitoring system may further include a feedback loop with a controller for regulating operation of the wind turbine system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A monitoring system for a wind turbine blade, comprising:
    an optical glass fiber provided on a wind turbine blade by one of embedding the optical glass fiber in the wind turbine blade or providing the optical glass fiber on a surface of the wind turbine, the wind turbine blade comprising a composite material;
    an optical receiver in optical communication with an end of the optical glass fiber; and
    a light transmitter in optical communication with an other end of the optical glass fiber, wherein the optical fiber is configured to break upon exceeding a defined tensile strength and provide an estimate of tensile load applied to the wind turbine blade.

2. The monitoring system of claim 1, wherein the optical receiver further includes a processor for processing data received by the optical receiver.

3. The monitoring system of claim 1, wherein the optical glass fiber has a constant diameter.

4. The monitoring system of claim 1, wherein the optical glass fiber has a diameter that increases from one end to the other end.

5. The monitoring system of claim 1, wherein the optical glass fiber has a diameter that decreases from one end to the other end.

6. The monitoring system of claim 1, further comprising additional optical glass fibers, wherein the additional optical glass fibers have a diameter equal to the glass optical fiber.

7. The monitoring system of claim 1, further comprising additional optical glass fibers having a diameter different from the optical glass fiber.

8. A wind turbine system, comprising:
    a nacelle seated on a tower;
    a rotor rotatably coupled to the nacelle, the rotor comprising a central hub and at least one wind turbine blade attached thereto, wherein the at least one wind turbine blade is formed of a composite material and an optical glass fiber provided on the wind turbine blade by one of embedding the optical glass fiber in the wind turbine blade and providing the optical glass fiber on a surface of the wind turbine;
    an optical receiver in optical communication with an end of the optical glass fiber; and
    a light transmitter in optical communication with an other end of the optical glass fiber, wherein the optical fiber is configured to break upon exceeding a defined tensile strength and provide an estimate of tensile load applied to the wind turbine blade.

9. The wind turbine system of claim 8, wherein the optical receiver further includes a processor for processing data received by the optical receiver.

10. The wind turbine system of claim 8, wherein the optical glass fiber has a constant diameter.

11. The wind turbine system of claim 8, wherein the optical glass fiber has a diameter that increases from one end to the other end.

12. The wind turbine system of claim 8, wherein the optical glass fiber has a diameter that decreases from one end to the other end.

13. The wind turbine system of claim 8, further comprising additional optical glass fibers having a diameter equal to the glass optical fiber.

14. The wind turbine system of claim 8, further comprising additional optical glass fibers having a diameter different from the optical glass optical fiber.

15. The wind turbine system of claim 8, further comprising a feedback loop in operative communication with the optical receiver and a controller for controlling operation of the wind turbine system.

16. A process for monitoring stress in a wind turbine blade of a wind turbine system, the process comprising:
    providing an optical glass fiber on a wind turbine blade by one of embedding the optical glass fiber in the wind turbine blade and providing the optical glass fiber on a surface of the wind turbine blade, wherein one end of the optical glass fiber is in optical communication with a light transmitter and an other end of the optical glass fiber is in optical communication with an optical receiver;
    transmitting light from the light transmitter through the optical glass fiber to the optical receiver; and
    monitoring a reduction in light transmission through the optical glass fiber wherein the optical fiber is configured to break upon exceeding a defined tensile strength to provide the reduction in light transmission and provide an estimate of tensile load applied to the wind turbine blade.

17. The process of claim 16, further comprising providing an additional optical glass fiber on the surface of the wind turbine blade by one of embedding the optical glass fiber in the wind turbine blade and providing the optical glass fiber on the surface of the wind turbine blade.

18. The process of claim 16, wherein the optical glass fiber and the additional optical glass fiber have equal diameter and tensile strengths.

19. The process of claim 16, wherein the optical glass fiber and the additional optical glass fiber have a different diameter and a different tensile strength.

20. The process of claim 16, further comprising determining a location of the reduction of light transmission through the optical glass fiber using pulse propagation.

* * * * *